United States Patent
Combs, Sr.

(10) Patent No.: US 6,203,264 B1
(45) Date of Patent: Mar. 20, 2001

(54) BOAT TRAILER CARRIER FOR OVER CAR DOLLY

(76) Inventor: Larry G. Combs, Sr., 11624 N. Nelson St., Milton, WI (US) 53563

(*) Notice: Subject to any disclaimer, the term of this patent is extended or adjusted under 35 U.S.C. 154(b) by 0 days.

(21) Appl. No.: 09/369,152

(22) Filed: Aug. 5, 1999

(51) Int. Cl.[7] .................................. B60P 3/08; B60P 3/10
(52) U.S. Cl. .......................... 414/483; 414/462; 414/480; 280/414.1
(58) Field of Search ..................................... 414/462, 471, 414/480, 482, 483, 500, 559, 563; 280/402, 414.1

(56) References Cited

U.S. PATENT DOCUMENTS

| | | | |
|---|---|---|---|
| 4,068,772 | * | 1/1978 | Prudhomme ...................... 414/480 X |
| 4,406,477 | * | 9/1983 | McDonald ......................... 280/414.1 |
| 4,469,346 | * | 9/1984 | Low .................................. 280/414.1 |
| 4,705,289 | * | 11/1987 | Weber .............................. 280/414.1 |
| 4,784,545 | * | 11/1988 | Lawrence ........................ 414/482 X |
| 4,880,250 | * | 11/1989 | Cravens et al. ................... 280/414.1 |
| 4,946,332 | * | 8/1990 | Daniels ............................ 414/483 X |
| 5,152,656 | * | 10/1992 | Potter ............................... 414/462 |
| 5,727,920 | * | 3/1998 | Hull et al. ....................... 414/482 X |
| 5,772,388 | * | 6/1998 | Clark ............................... 414/462 X |
| 5,863,173 | * | 1/1999 | Bremner ......................... 414/559 X |

* cited by examiner

Primary Examiner—James W. Keenan
(74) Attorney, Agent, or Firm—Howard M. Herriot

(57) ABSTRACT

A post-and-beam mechanism easily connectable to a standard car dolly carries on its beams a standard boat trailer, loaded with boat and outboard motor, above the front end of a towed vehicle on the dolly, with the rear, heavy end of the trailer and boat located forward most. A motor home may tow, to the destination site, the dolly thus loaded with towed vehicle, boat trailer, boat and motor. The post-and-beam mechanism is pivotably swingable from a low position for loading the loaded boat trailer thereon; to a high position for carrying the loaded boat trailer. The towing is safely done, with advantageous forward weight distribution of the carried trailer, boat and motor, and with short combined overall length of towing vehicle and towed vehicle, for easy driving and parking. When the destination site is reached, the towed vehicle is unloaded from the car dolly, and the mechanism may be lowered from the high position to the low position for unloading the boat trailer. An arrangement of pull pins and cotter keys enable part of the post-and beam mechanism to stay attached to the boat trailer, enables part to be easily disconnected and set aside, and enables the rest to remain attached to the car dolly. This permits convenient and separate independent usage of either the car dolly or the boat trailer with either the towing vehicle or the towed vehicle, or with other vehicles at or near the destination site.

13 Claims, 10 Drawing Sheets

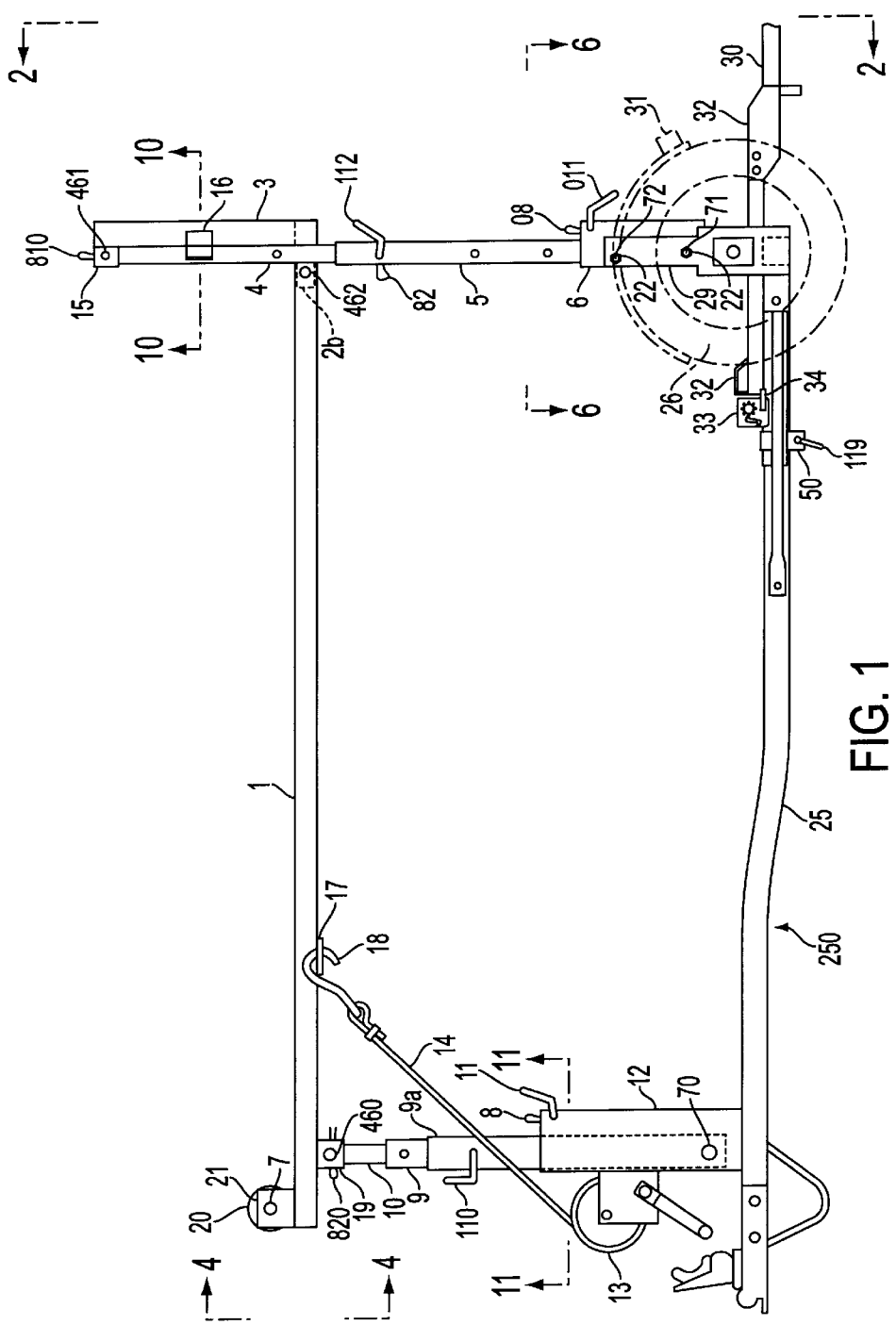
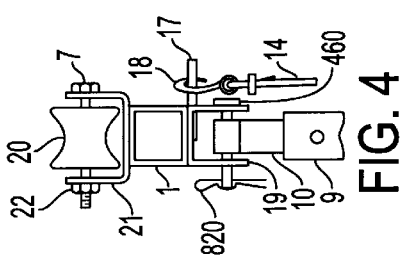
FIG. 1
FIG. 4

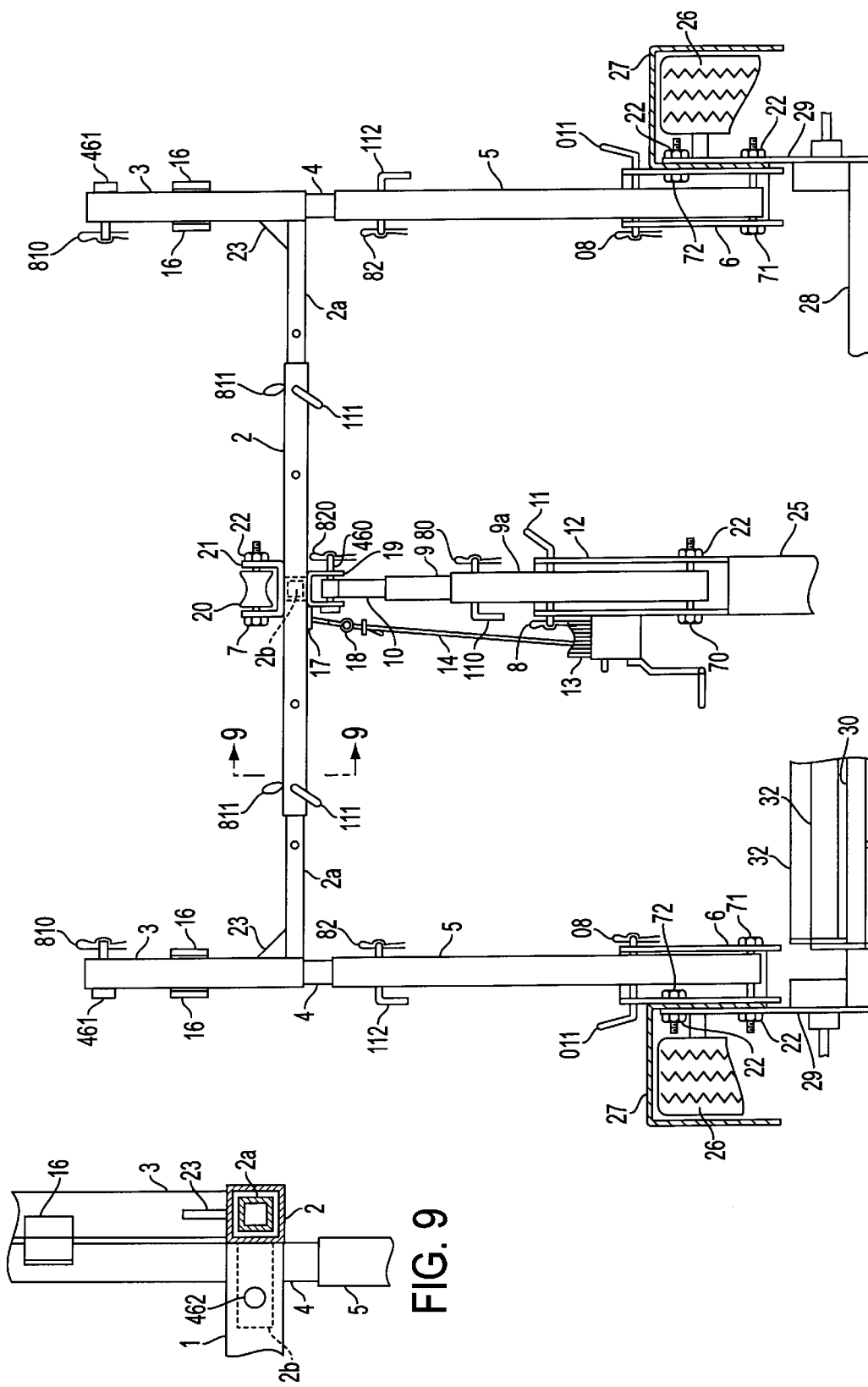

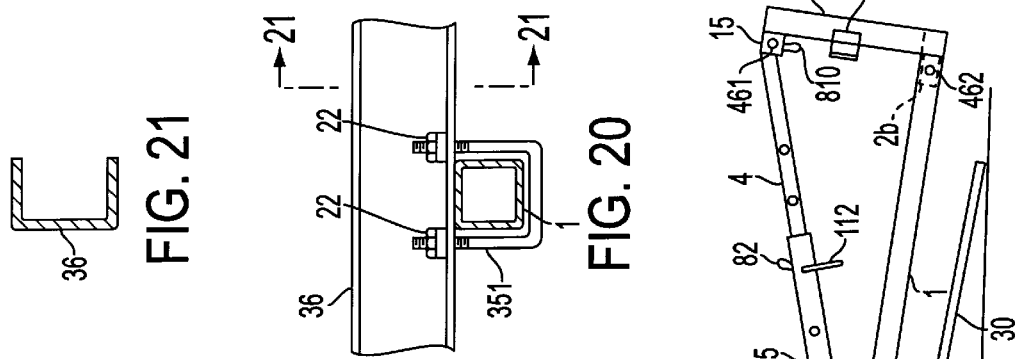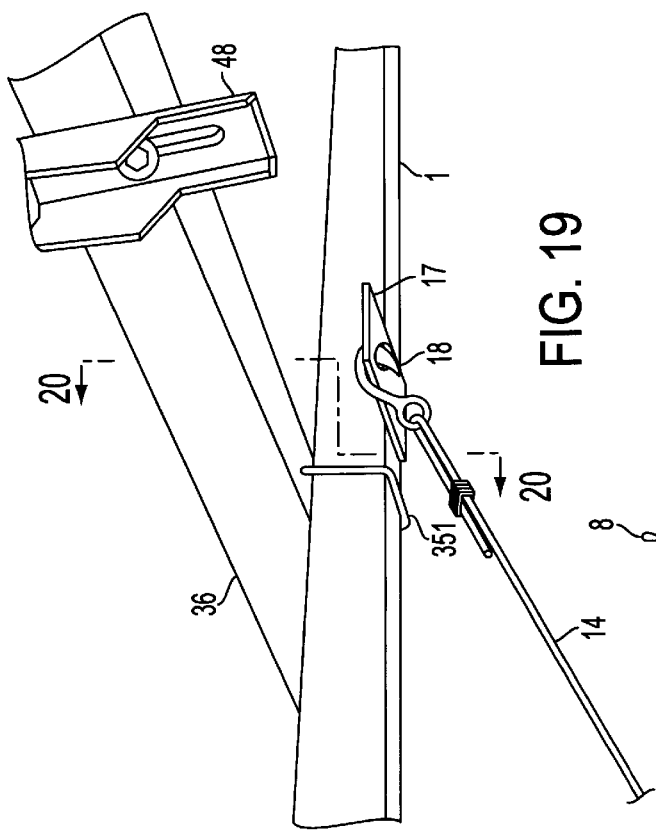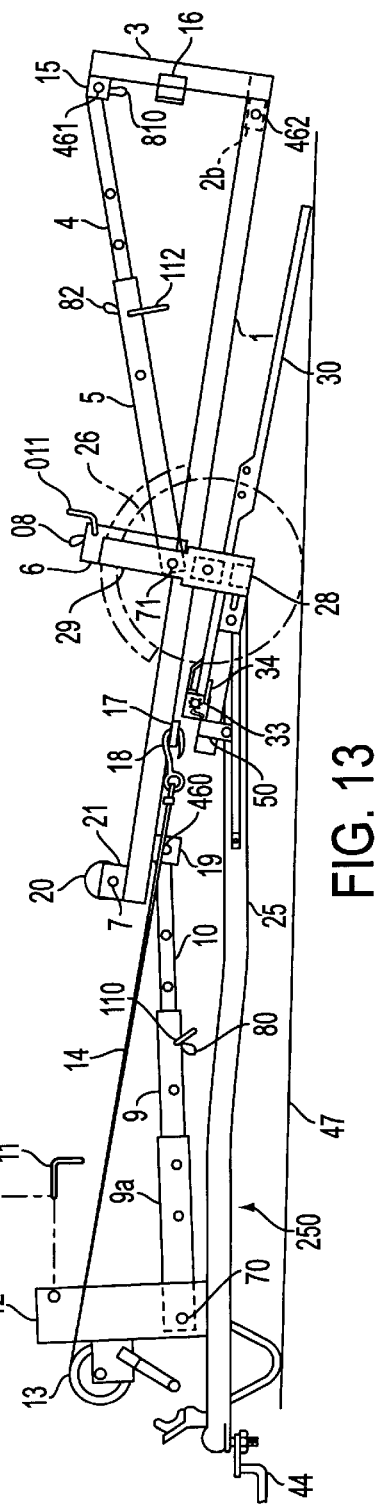

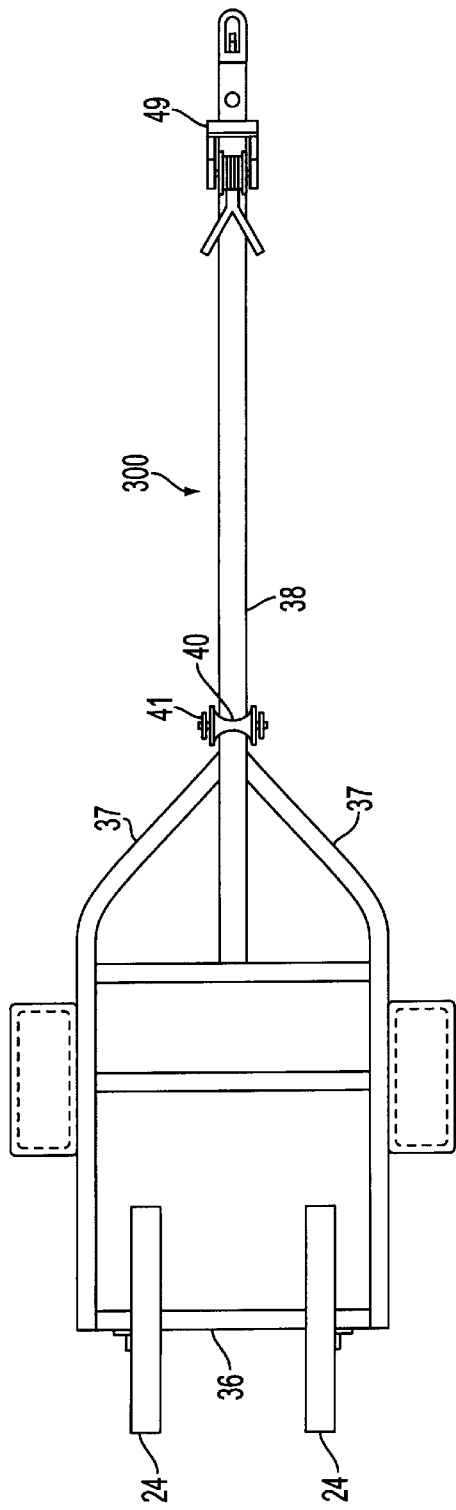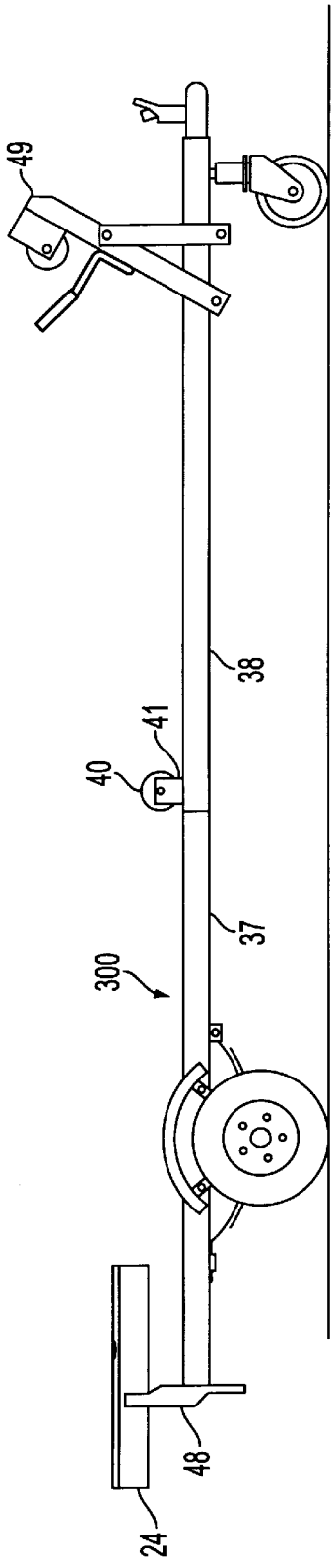
FIG. 15 (PRIOR ART)
FIG. 14 (PRIOR ART)

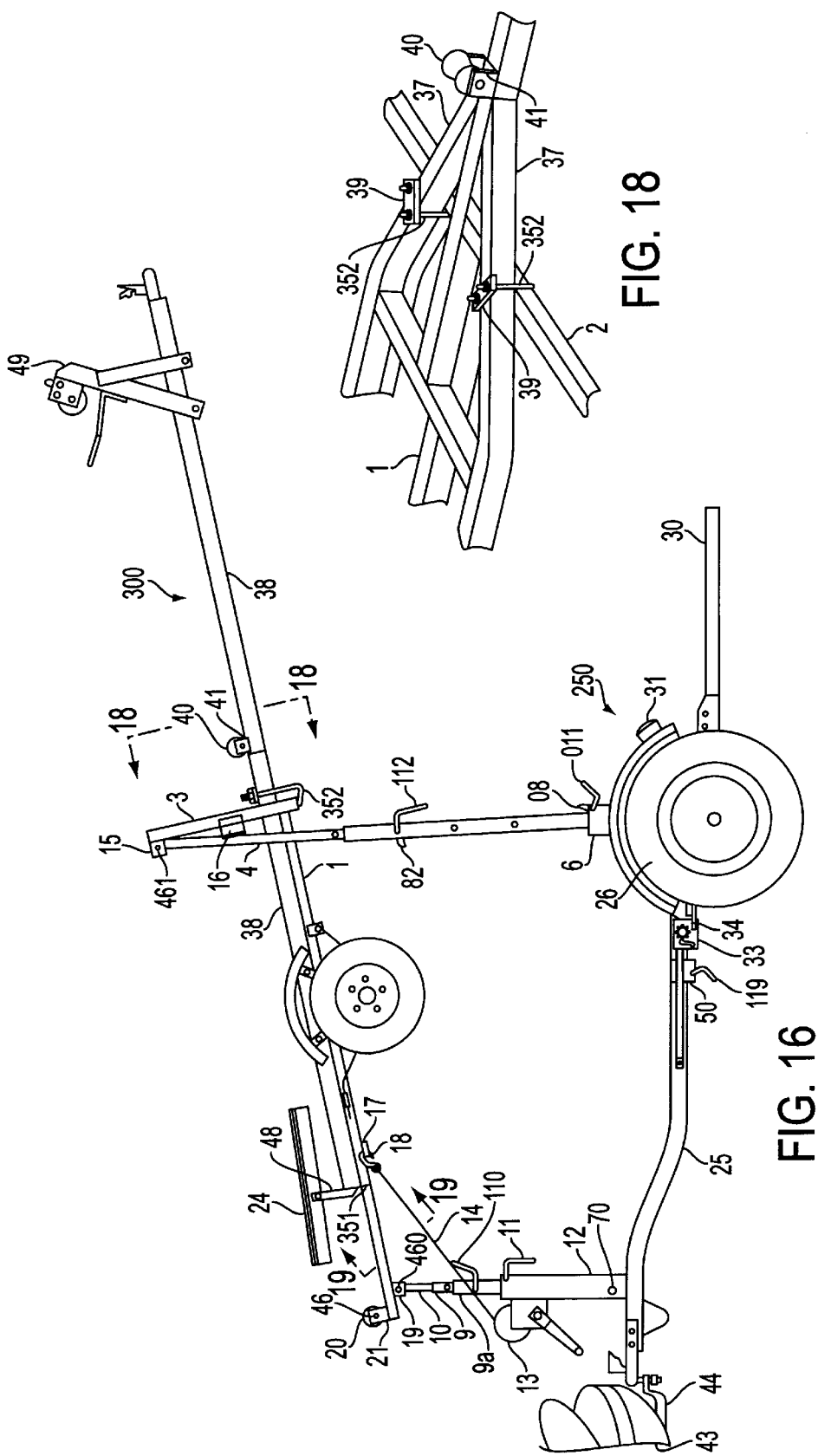

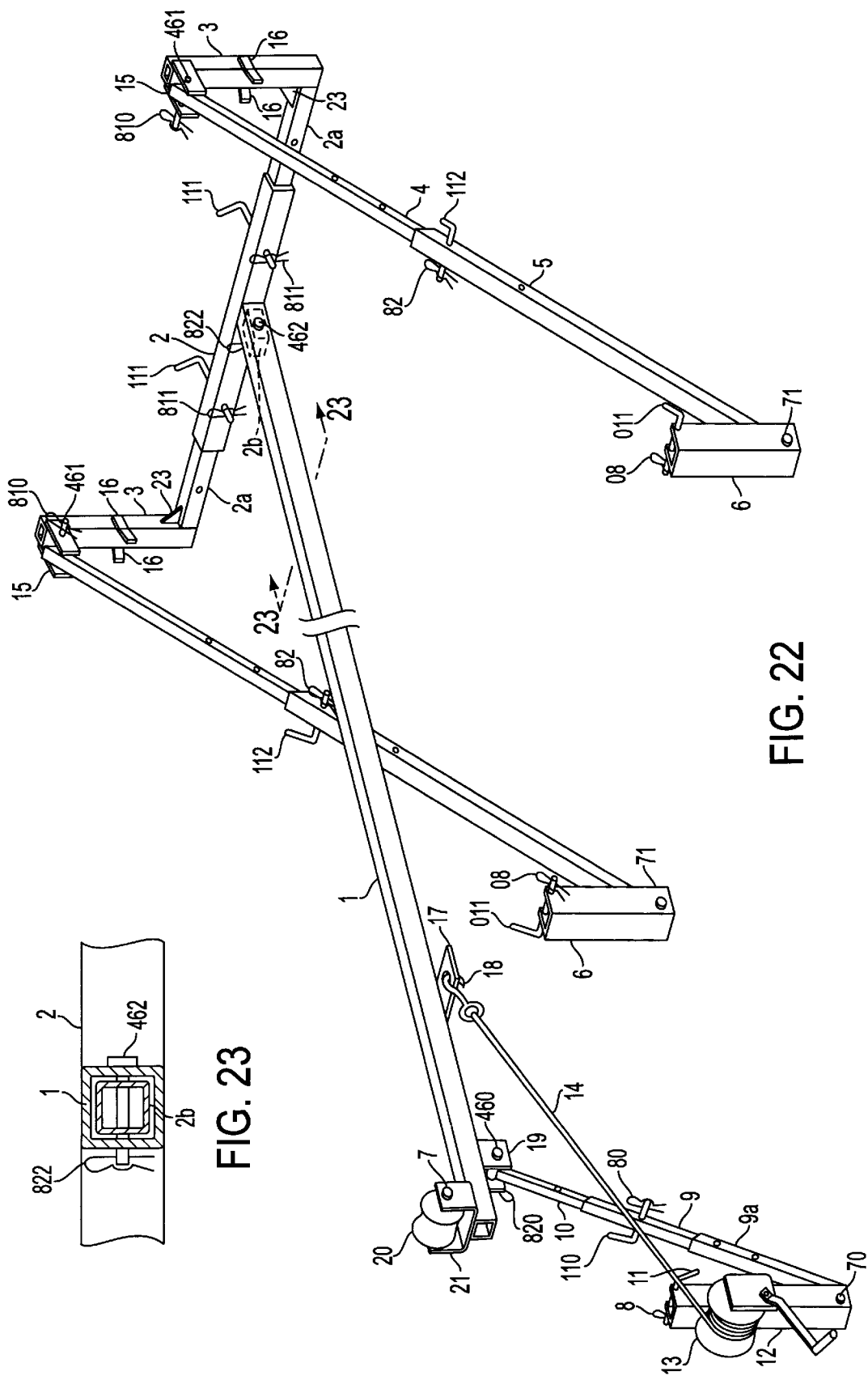

BOAT TRAILER CARRIER FOR OVER CAR DOLLY

BACKGROUND OF THE INVENTION

The present invention relates to recreational vehicles, and particularly to a means for towing, behind a motor home or other towing vehicle, a towed car, truck or other towed vehicle, on a car dolly, with a boat trailer loaded with boat and motor, carried above the front end of the towed vehicle.

It is desirable that vacationers, retirees, and other persons be able to conveniently and safely travel in a motor home or other towing vehicle, and safely and conveniently tow behind such vehicle, a car dolly loaded with a car, station wagon, pick up truck, or other towed vehicle; and to have carried above said dolly a boat trailer, boat and outboard motor, with the heaviest part of the boat trailer and boat being forward of the dolly wheels and as near as possible to the towing vehicle, so as to have advantageous location of the weight-load of the trailer, boat and motor load and so as to also have advantageous short-length of the combination of towing vehicle and towed items, for easier handling while driving and for taking up less room while parking. It is further desirable for such persons, when having towed the items to the travel destination, to be able to conveniently separate the towed items into four usable components: towing vehicle; car dolly; boat trailer with boat and boat motor thereon; and towed vehicle. Such separation permits independent use of all possible combinations of the vehicles with the other components. It permits use of the towed vehicle to tow the loaded or empty boat trailer for certain trips; and use of the towing vehicle to tow the loaded or empty boat trailer for other trips; and use of the towing vehicle to tow the car dolly loaded with the towed vehicle on yet other trips.

Potter U.S. Pat. No. 5,152,656 discloses a trailer which can carry, on its lower frame, the front end of a small automobile, acting as a car dolly, and can also carry, on its upper frame, above the front end of the automobile, a boat with its bow forward; which trailer can also be used to water launch the boat after the automobile has been removed from the trailer. This trailer does not provide the advantageous weight distribution of having the heaviest end (the stern) of the boat, positioned forwardly. This trailer lacks the versatility of the invention herein described, by not permitting use of a boat trailer and a car dolly separately and independently at times, e.g. not being able to use the towing vehicle to tow the car dolly and car on one trip, while at the same time being able to have the boat trailer towed behind the towed vehicle or another (third) vehicle available in the vicinity; or to have such third vehicle tow the car dolly and towed car on one trip, while the towing vehicle is used to tow the boat trailer on a different trip.

SUMMARY OF THE INVENTION

These and other disadvantages are overcome by the present invention, which provides a mechanism conveniently mountable on a standard car dolly, to carry, above the front end of a car on the dolly, a standard boat trailer loaded with boat and outboard motor, with the heavy end of boat and trailer forward, and whereby when travel destination is achieved, and the towed car and boat trailer are unloaded, the mechanism is partially removable from the car dolly, permitting the car dolly and boat trailer to be conveniently used separately and independently in hook-up to either the towing vehicle or the towed vehicle, or to any other vehicles in the destination vicinity.

A mechanism in accordance with this invention includes a post-and-beam mechanism, having a forward central post, a pair of rearward parallel side posts connected by a rear cross beam, and a longitudinal beam connecting the top of the forward post with the center of the rear cross beam. The bottom ends of the posts are pivotably connected to mounts on a standard car dolly. The top of the forward post is removably pivotably connected to the longitudinal beam near the forward end of the beam. The rearward end of the longitudinal beam is fixedly connected to the center of the cross beam. The posts may thus be swung from a substantially horizontal low position along the dolly to a high position above the dolly. In the low position, a standard boat trailer (with boat and motor thereon) may be backed onto the mechanism so that the trailer rests on said beams. The posts are then pivotably swung to the high position, the posts supporting the beams and the boat trailer thereon.

A standard crank reel winch and cable is used to raise and lower the mechanism to any desired position between fully lowered position and fully raised position, and ratchet-lock the mechanism in the desired position selected. The posts, in their bottom portions, are pivotably mounted in U-shaped channel mounts in which the "U" opens rearwardly. In the upright position of the posts, each post is within its associated U-shaped channel, and may be locked therein by pull pin and cotter key arrangement provided near the top of the channel mount.

BRIEF DESCRIPTION OF THE DRAWINGS

FIG. 1 is a side elevation view of the mechanism mounted on a standard car dolly with the mechanism in a raised position with the posts in upright vertical position;

FIG. 2 is a rear elevation view of the dolly-mounted mechanism shown in FIG. 1, taken along lines 2—2 in FIG. 1, with portions of the dolly removed;

FIG. 4 is a front elevation view of the upper-front part of the mechanism, taken along lines 4—4 in FIG. 1;

Figure 3:
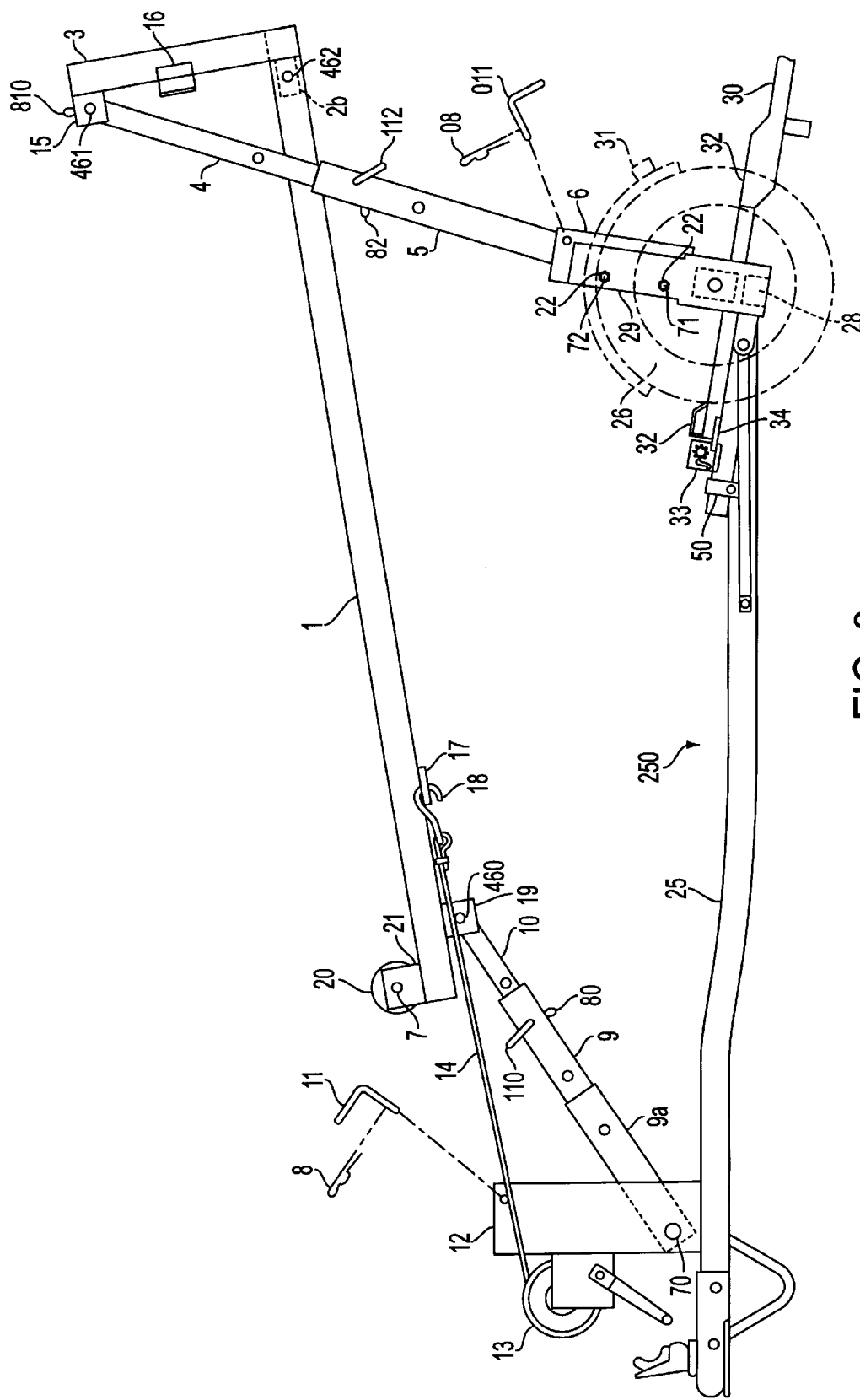
FIG. 3 is a side elevation, similar to FIG. 1, but with the mechanism in less raised position and the posts swung out of vertical position.
Figure 11:
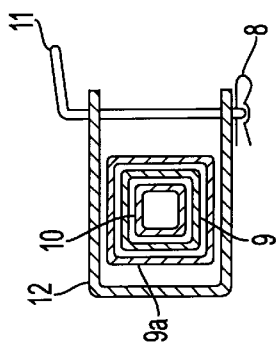
Figure 6:
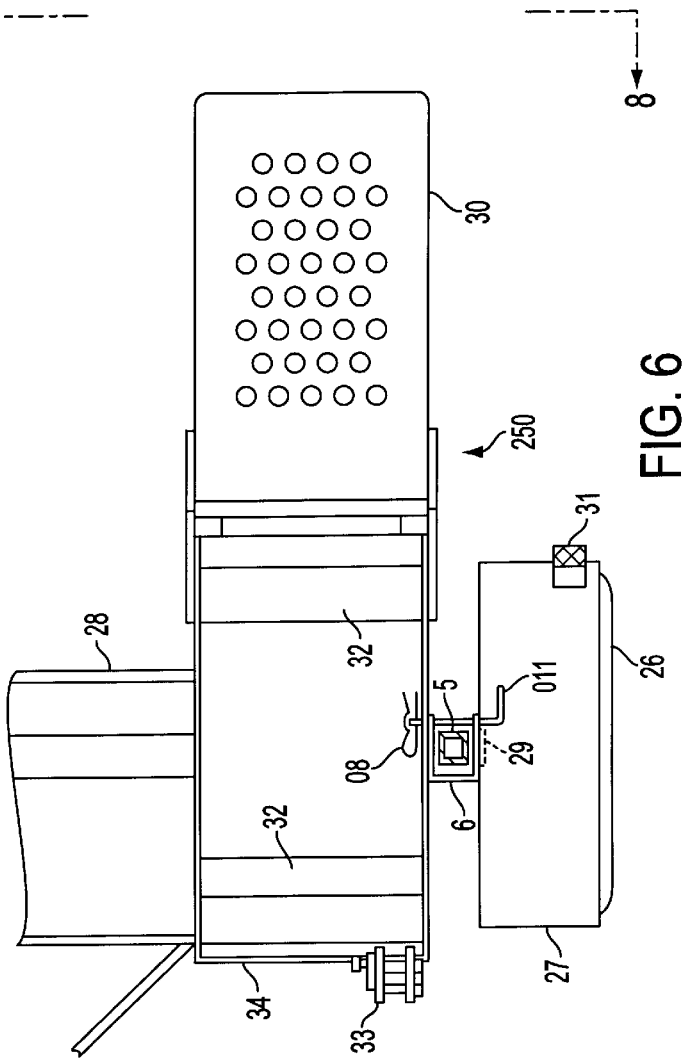
Figure 12:
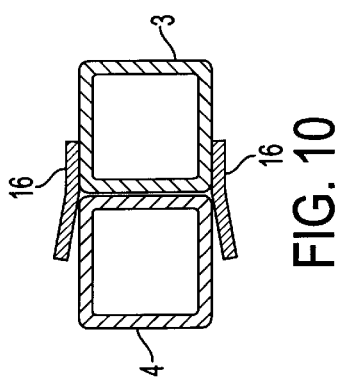
Figure 10:
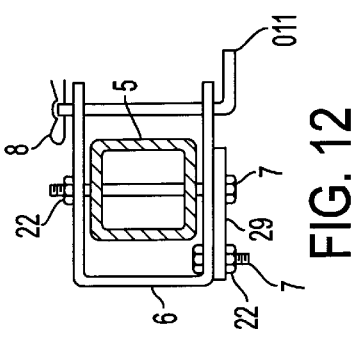
Figure 7:
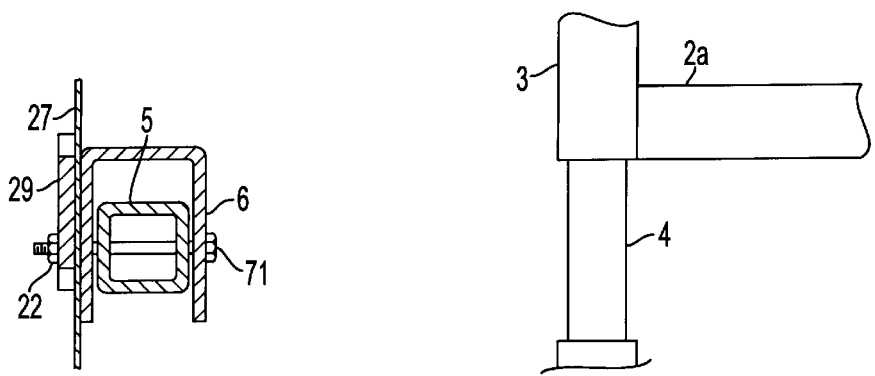
Figure 8:
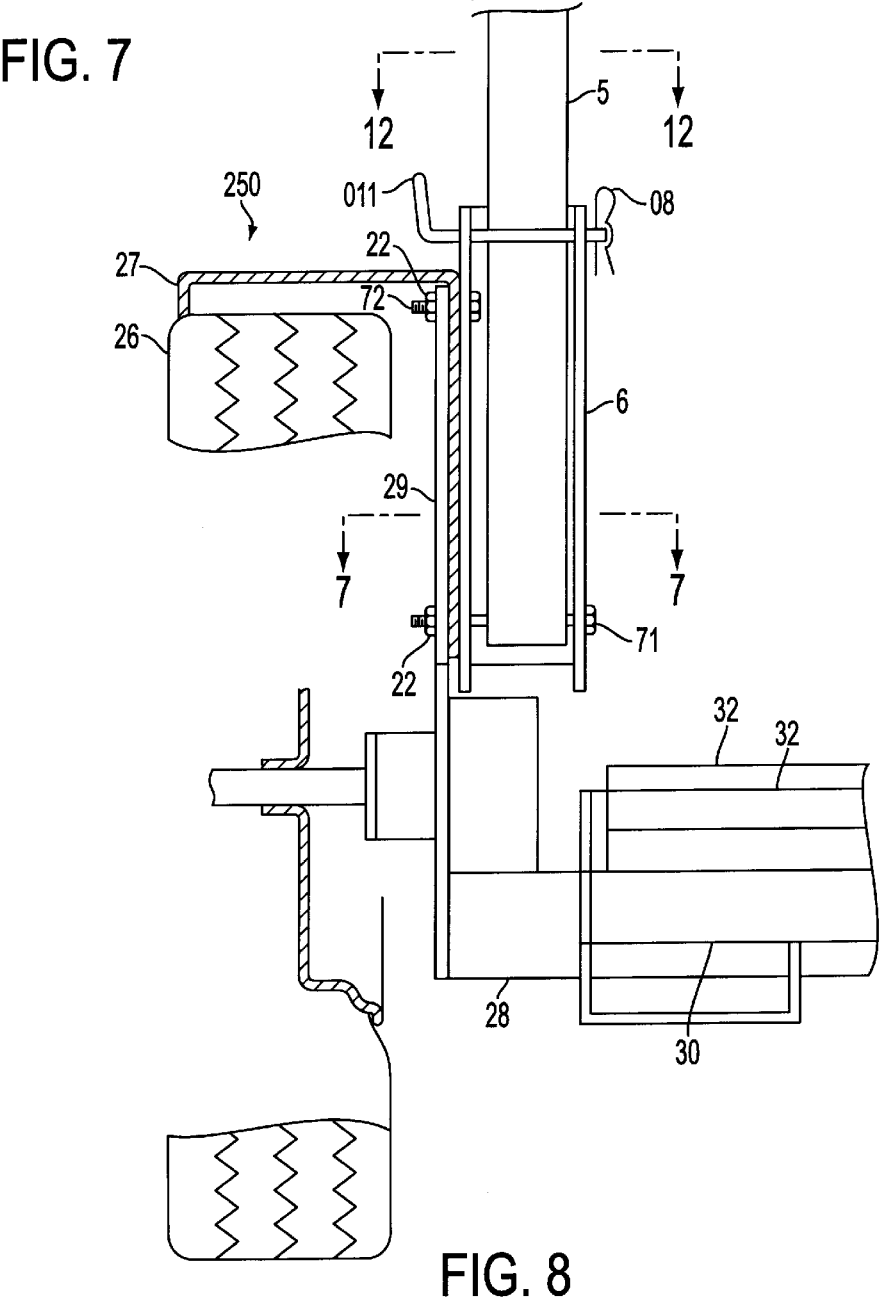
Figure 17:
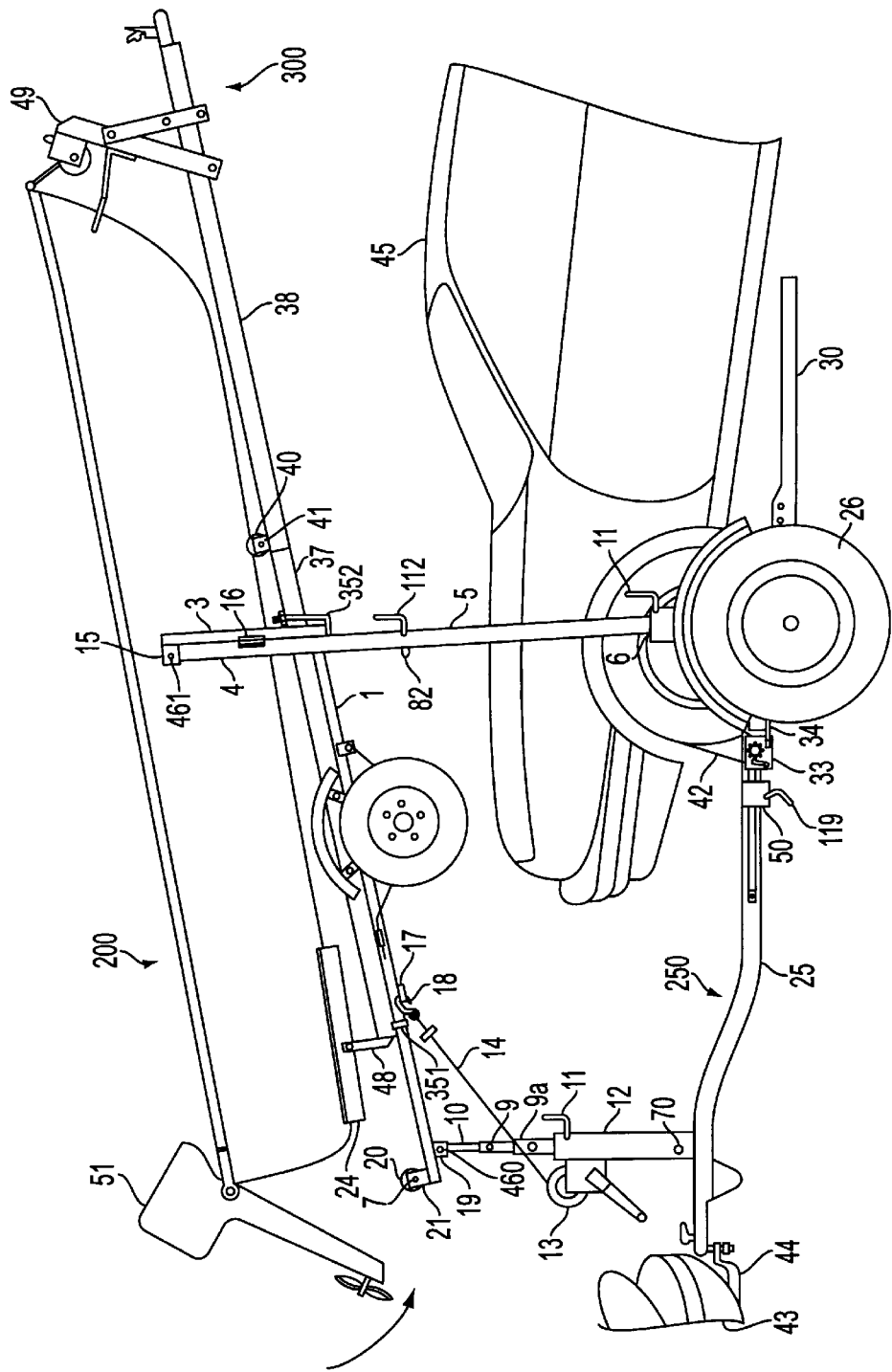

There is not a FIG. 5;

FIG. 6 is a top plan view of the lower rear left portion of the mechanism and the portion of the dolly supporting same, taken along lines 6—6 in FIG. 1;

FIG. 7 is a cross sectional view of a portion of the mechanism and dolly, taken along line 7—7 of FIG. 8;

FIG. 8 is a rear elevation view of the lower-rear left portion of the mechanism and dolly, taken along lines 8—8 in FIG. 6;

FIG. 9 is an enlarged cross sectional view of a portion of the mechanism, taken along lines 9—9 of FIG. 2;

FIG. 10 is an enlarged cross sectional view of a portion of the mechanism, taken along lines 10—10 in FIG. 1;

FIG. 11 is an enlarged cross sectional view of a portion of the mechanism, taken along lines 11—11 in FIG. 1;

FIG. 12 is an enlarged cross sectional view of a portion of the mechanism, taken along lines 12—12 in FIG. 8;

FIG. 13 is a side elevation view of the mechanism, similar to FIGS. 1 and 3, but with the mechanism in fully lowered position;

FIG. 14 is a side elevation view of a standard boat trailer;

FIG. 15 is a top plan view of a standard boat trailer;

FIG. 16 is a side elevation view similar to FIGS. 1 and 3, but with the mechanism in a raised boat trailer carrying position and showing a boat trailer thereon, and showing a tow vehicle hitched to a car dolly;

FIG. 17 is a side elevation view similar to FIG. 16, with the mechanism in the carrying position, but showing a boat and motor on the boat trailer, carried on the mechanism, and a car on the car dolly, the car dolly hitched to a tow vehicle, ready for towing;

FIG. 18 is an isometric view of a portion of a boat trailer and a portion of the cross beam of the mechanism attached to the boat trailer, taken along lines 18—18 of FIG. 16;

FIG. 19 is an isometric view of a portion of a boat trailer, and a portion of the longitudinal beam of the mechanism attached to the boat trailer, taken along lines 19—19 of FIG. 16;

FIG. 20 is a cross sectional view, taken along lines 20—20 of FIG. 19;

FIG. 21 is a cross sectional view, taken along lines 21—21 of FIG. 20.

FIG. 22 is an isometric view of the mechanism in an intermediate position; and

FIG. 23 is a cross sectional view of a portion of the mechanism, taken along lines 23—23 of FIG. 22.

DETAILED DESCRIPTION

Referring to the drawings, and particularly to FIG. 17, the post-and-beam mechanism of this invention is mounted on a standard car dolly 250 and may be used for safely carrying, above the front end of a car 45 on the dolly, a standard outboard motor boat trailer 300 loaded with boat 200 and outboard motor 51. A motor home 43 or other towing vehicle with a tow hitched 44 may safely tow the car dolly and car, with the boat trailer, boat and motor carried above the car dolly and close to the towing vehicle, with advantageous forward weight distribution.

A standard boat trailer 300 is shown in FIGS. 14 and 15, and is the usual design having boat pad rests 24, tongue 38, angled frame members 37, rear end cross member as shown in FIG. 36, boat rest mounting bracket 48, boat guide pulley 40 in bracket 41 and boat stop assembly 49.

A standard car dolly 250, shown in FIGS. 1, 2, 3, 6, 8, 13, 16 and 17, is the usual design having a main frame 25, wheels 26, fenders 27, underframe 28, brackets 29, car ramps 30, tail lights 31, car wheel stops 32, wheel strap take-up ratchets 33, ratchet mounting brackets 34, car wheel tie-down straps 42 and anchor straps 50.

The mechanism of this invention has a telescopically adjustable forward post 9a, 9, 10, formed of square tubing, with its lower end 9a pivotably mounted at bolt 70 in support channel mount 12 near the lower end thereof. Channel mount 12 is fixedly connected to the dolly main frame 25 near the front thereof. The pivot bolt 70 goes through post 9a and channel mount 12. The U-shaped channel mount 12 is open rearwardly. The forward post 9a, 9, 10 is telescopically adjustable via holes in members 9 and 10, and a removable pull pin 110 and associated cotter key 80. This telescopic adjustment permits setting to the least possible height, to accommodate towed vehicles of various sizes, while still leaving enough space for accommodating the height of the front end of the towed vehicle. A removable pull pin 11, and cotter key 8 are provided to close and open channel 12 near the top of channel 12.

The mechanism has a pair of spaced-apart telescopically adjustable rearward posts 4, 5, formed of square tubing. The lower end of each rearward post is pivotally mounted via pivot bolt 71 in a channel mount 6 near the lower end thereof. Channel mount 6 is U-shaped, opening rearwardly, and is fixedly connected to the dolly, being bolted to dolly bracket 29 through dolly wheel housing fender 27 with bolt 72.

The rearward posts 4, 5 are telescopically adjustable via hole and pin arrangement of pull pins 112 and cotter keys 82. This telescopic adjustment assists in setting the posts to the least possible height, for various sized towed vehicles, while still leaving enough space to accommodate the height of the front end of the towed vehicle.

The upper end of each post 4, 5 is removably pivotably mounted to the top end of a vertical bar 3 via a bracket 15 on bar 3 and a pivot pull pin 461, which pin is removable by pulling cotter key 810. Each vertical bar 3 extends downwardly and its bottom end is fixedly connected to a square tubing horizontal cross piece 2a of the horizontal cross beam 2, 2a. Each cross piece 2a extends within square tubing cross beam member 2. The cross beam 2, 2a is telescopically adjustable via a hole and pin arrangement using pull pins 111 and cotter keys 81. This telescopic width adjustment is to best accommodate the width of the trailer, as standard boat trailers may vary in width somewhat. The outer ends 2a of the cross beam are fixedly connected to the lower ends of vertical bars or legs 3. Angle braces 23 are provided to strengthen that connection. Cross beam 2, 2a and vertical legs 3 form a U-shaped cradle, the "" U of which opens upwardly. This cradle pivotably swings about pivot pins 461, and it is into this cradle that the boat trailer is backed while loading. The cradle and longitudinal beam 1 fixed thereto, swing about the pivot pins 461, and the vertical legs 3 of the cradle swing away from posts 4 when the mechanism is lowered and toward posts 4 when the mechanism is raised. A stabilizing ear or bracket 16 is welded or otherwise fixedly connected to each of the outer edges of each leg 3 near the midpoint of the top and bottom thereof. Each pair of these brackets 16, when the mechanism is in an upper position, such as the loaded and driving position, shown in FIG. 17, engage the edges of rearward posts 4 to stabilize the mechanism against cross-wise, side-to-side sway, generally strengthening the mechanism. Each ear 16 is flared outwardly slightly, to conveniently guide the post 4 within the bracket ear pair, when the mechanism is cranked to the post upright position such as shown in FIGS. 1, 2, 10, 16, 17 and 24.

The top end of forward post 9a, 9, 10 is pivotably mounted to a longitudinal main support beam 1, near the front end of beam 1, via a bracket 19, and a pivot pull pin 460 which is held in place by cotter key 820. Forwardly thereof, at the very front of main beam 1, a pulley rest 20 is connected to beam 1 via a bracket 21 and a bolt 7. The pulley rest may serve to cradle-rest the inside-lower edge of an outboard motor 51 on the boat, when the motor is swung in the direction shown by the arrow in FIG. 17 to bring the motor to rest against the rest 20. The rearward end of main beam 1 is removably fixedly connected to the center of cross-beam member 2 by way of a cross-beam extension stub 2b and bolt 462. A cotter key 822 permits removal of bolt 462.

A standard take-up crank winch and cable reel assembly 13 is mounted on the front edge of support channel 12, and has a cable 14 which may extend from the reel to a hook 18 to engage bracket 17 on main support beam 1, the bracket located forward of the midpoint of main beam 1, and rearward of the pivot bolt 460 in bracket 19 at the top of forward post 10.

To allow the forward post to swing downward and rearward out of channel mount 12, a pull pin 11 is removed from channel mount 12, which permits cranking the mechanism down to a lower position such as shown in FIGS. 3, 13 and 22. Pull pins 011, when removed from channel mount 6, permit rearward posts 4, 5 to be swung out downwardly and rearwardly of the channels 6, when cranking the mechanism down to a lower position. When the mechanism is cranked to a high position, such as shown in FIGS. 1, 16, and 17, the pull pins 011, when inserted in the channels 6 and secured with cotter keys 08, lock the rear posts 5, 4 upright or vertical in channels 6; and the pull pin 11, when inserted in channel 12 and secured with cotter key 8, locks the forward post 9a, 9, 10 in upright or vertical position in channel 12.

The pivotably connected post-and-beam arrangement of the mechanism, along with the crank reel winch and cable hook-up, enable the mechanism to be raised and lowered between a down position on the car dolly, as shown in FIG. 13, and an upper position above the car dolly, as shown in FIGS. 1, 16 and 17. In the down position, the boat trailer, loaded with boat and outboard motor, may be wheeled backwards onto the dolly ramp and into position to rest on the beams of the mechanism. The rear end cross member 36 of the trailer rests on main beam 1 of the mechanism/as shown in FIGS. 19 and 20, lying transverse thereto at right angle, just rearward of bracket 17. The front angle members 37 of the trailer rest on cross beam 2 of the mechanism, as shown in FIG. 18. As shown in FIGS. 19 and 20, a U-bolt 351 extends through holes in channel member 36 and around main beam 1, and is secured with nuts 22 to hold the trailer firmly to beam 1. As shown in FIG. 18, U-bolts 352 are placed around cross beam 2 and angle members 37, and secured with anchor plates 39 and associated nuts to hold the trailer firmly to cross beam 2. The mechanism may be cranked to a position high enough to leave enough space for the front end of a car to be on the dolly. The car may be driven upon the dolly in the usual way and the car front end secured to the dolly in the usual fashion using the anchor strap 50 and its associated equipment.

With the mechanism-to-trailer U-bolt securements, and with the side-sway stabilization ear bracket pair 16 engaging posts 4 when the mechanism is in the carrying-and-tow position as shown in FIG. 17, a safe and easy towing of the car dolly, car, boat, motor and boat trailer is achieved, as well as easy parking of the towing vehicle and towed items.

Upon reaching the travel destination, the towed vehicle may be removed from the car dolly, and the mechanism then lowered to lowest position. Cable hook 18 is unhooked from bracket 17. Pull pin 460 is removed, and pull pins 462 are removed. Pull pins 111 are removed as are pull pins 461, thereby permitting the L-shaped members 3, 2a to be removed and set aside. Beam 1 and cross beam 2 remain fixed to the boat trailer. The boat trailer may then be wheeled off the mechanism and dolly. The dolly may then be detached from the motor home. The towed vehicle or the motor home may now be used to tow the boat trailer or the car dolly.

As explained above, the mechanism is partially disconnected from the car dolly, thus making the car dolly, free of part of the mechanism, lighter and available for use with any towing vehicle such as the motor home, the towed vehicle or other vehicle available at the travel destination site. The forward post 9a, 9, 10 and rearward posts 4, 5 remain connected to the car dolly, along with mounts 12 and 6. The car dolly may now be used with the motor home or any other vehicle at hand to tow the towed vehicle or other vehicle at hand. While so using the dolly, the posts 9a, 9, 10 and 4, 5 are locked in their upright vertical positions with pull pins and cotter keys.

The set-aside L-shaped members 3, 2a may be stored for future use. The beam 1 and cross bam 2 are left bolted to the trailer, stored there for future use.

When it is desired to again tow a vehicle and carry the boat trailer there over, the posts are cranked to the low (loading) position, the trailer is backed on to the dolly, the L-shaped members 3, 2a reconnected with the pull pins and cotter keys, to connect with posts 4 and cross beam 2; and the main beam 1 is connected to post 10 with the pull pins and cotter keys. Thus connected, and with cable hook 14 re-connected to bracket 17, the boat trailer may be cranked up to carrying position by the crank winch, such as the position shown in FIGS. 16, 17, and the towed vehicle may driven up on and backed to the car dolly.

The terms and expressions employed in the above specification are intended to be descriptive, not limited, and not exclusive of equivalents of the features shown and described, it being recognized that the scope of the invention is defined and limited only by the claims which follow.

What is claimed is the invention defined in the following claims.

What is claimed is:

1. A post-and-beam mechanism mounted on a standard car dolly for carrying a standard boat trailer spaced above a car on said dolly, said dolly including a left and a right wheel, and said trailer including angle frame members, a tongue and a rear cross member, said mechanism comprising:

a U-shaped front channel mount fixed to said dolly near the front of the dolly with the channel open to the rear;

a front central post pivotably connected near its bottom in said mount near the bottom thereof;

a pair of U-shaped rear channel mounts fixed to said dolly near the rear of the dolly, one near the left wheel of the dolly and the other near the right wheel of the dolly, the channels of said U-shaped channel mounts opening to the rear;

a pair of rear side posts each pivotably mounted near its bottom in one of said rear channel mounts near the bottom thereof;

an upwardly opening U-shaped cross-beam cradle comprising a horizontal tubular central cross beam and a pair of L-shaped members, each of said L-shaped members having a horizontal beam leg thereof telescopically engaging and removably connected to said central cross beam, and having a vertical leg the free end of which is removably pivotably connected to the top of one of said side posts;

said central cross beam being firmly fixedly connectable to the boat trailer angle frame members rearwardly of the tongue of the frame;

a longitudinal beam firmly fixedly connectable intermediate its ends to the rear cross member of the boat trailer frame, the beam being removably pivotably connected at its front end to the top of said front central post, and the beam being fixedly connected at its rear end to the center of said cross beam; and winch means for swinging said mechanism between a lowered position for unloading and loading the trailer from the mechanism, and a raised position for carrying the trailer above a car on said dolly.

2. The invention of claim 1 wherein each of said rear posts comprises a plurality of telescoping tubular members, to allow adjustment of post height.

3. The invention of claim 1 where each of the three posts comprises a plurality of telescoping tubular members, to allow adjustment of post height.

4. The invention of claim 3 wherein each of the tubular telescoping members of said posts has therein height adjusting holes, and has an associated pull pin and cotter key arrangement to set the height to various selected distances.

5. The invention of claim 1 wherein the vertical leg of each of said L-shaped members has an ear bracket on at least one side thereof intermediate its ends projecting forwardly for engaging a side of a rear post when the mechanism is in trailer-carrying raised position, to strengthen the mechanism and prevent side-to-side sway.

6. The invention of claim 1 wherein the vertical leg of each of said L-shaped members has an ear bracket on each side thereof projecting forwardly for engaging both sides of a rear post when the mechanism is in trailer-carrying raised position, to strengthen the mechanism and prevent side-to-side sway.

7. The invention of claim 6, wherein at least one of each pair of ear brackets is flared outwardly at its free forward end.

8. The invention of claim 6 wherein each one of each pair of ear brackets is flared outwardly at its free forward end.

9. The invention of claim 1 wherein the winch means has its cable removably connectable to said longitudinal beam within the forward one-third of said longitudinal beam, whereby cranking the winch may swing the posts about their bottom pivots between a nearly horizontal position for loading and unloading said trailer, and a vertical position for carrying said trailer above a car on said dolly.

10. The invention of claim 1 wherein each of the three channel mounts has holes therethrough near the top thereof to accept an associated pull pin and cotter key for locking a post in upright vertical position in the mount when the mechanism is in trailer carrying raised position.

11. The invention of claim 1 wherein the central cross beam and the horizontal beam leg of each of the L-shaped members have width adjusting holes therethrough to accept an associated pull pin and cotter key for locking the cross beam cradle in a selected width.

12. The invention of claim 1 wherein a pull pin and cotter key arrangement connects the front end of said longitudinal beam to the top of said front post so that the beam is removably pivotably connected to the top of said front post.

13. The invention of claim 1 wherein a pull pin and cotter key arrangement connects the free outer end of the vertical leg of each L-shaped member to the top of its associated rear post so that the top of each of the rear posts is removably pivotable connected to the free outer end of its associated vertical leg.

* * * * *